(12) United States Patent
Bailey et al.

(10) Patent No.: US 7,036,379 B2
(45) Date of Patent: May 2, 2006

(54) FLUID DIFFUSION RESISTANT GLASS-ENCASED OPTICAL SENSOR

(75) Inventors: Timothy J. Bailey, Longmeadow, MA (US); Mark R. Fernald, Enfield, CT (US); Alan D. Kersey, South Glastonbury, CT (US); Trevor W. MacDougall, Simsbury, CT (US); Martin A. Putnam, Cheshire, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 11/104,180

(22) Filed: Apr. 12, 2005

(65) Prior Publication Data

US 2005/0183507 A1    Aug. 25, 2005

Related U.S. Application Data

(63) Continuation of application No. 10/427,335, filed on May 1, 2003, now Pat. No. 6,877,378, which is a continuation of application No. 09/494,417, filed on Jan. 31, 2000, now Pat. No. 6,626,043.

(51) Int. Cl.
*G01L 9/00*   (2006.01)
*G01J 1/34*   (2006.01)

(52) U.S. Cl. .................................. 73/705; 250/227.21

(58) Field of Classification Search .................. None
See application file for complete search history.

(56) References Cited

U.S. PATENT DOCUMENTS 6,626,043 B1 *   9/2003   Bailey et al. .................. 73/705
6,877,378 B1 *   4/2005   Bailey et al. .................. 73/705

* cited by examiner

*Primary Examiner*—Harshad Patel
(74) *Attorney, Agent, or Firm*—Patterson & Sheridan, L.L.P.

(57) ABSTRACT

A fluid diffusion resistant tube-encased fiber grating pressure sensor includes an optical fiber 10 having a Bragg grating 12 impressed therein which is encased within a sensing element, such as a glass capillary shell 20. A fluid blocking coating 30 is disposed on the outside surface of the capillary shell to prevent the diffusion of fluids, such as water molecules from diffusing into the shell. The fluid diffusion resistant fiber optic sensor reduces errors caused by the diffusion of water into the shell when the sensor is exposed to harsh conditions.

20 Claims, 4 Drawing Sheets

FLUID DIFFUSION RESISTANT GLASS-ENCASED OPTICAL SENSOR

CROSS-REFERENCE TO RELATED APPLICATIONS

This application is a continuation of U.S. patent application Ser. No. 10/427,335, filed May 1, 2003, now U.S. Pat. No. 6,877,378 which is a continuation of U.S. patent application Ser. No. 09/494,417, file Jan. 31, 2000, now U.S. Pat. No. 6,626,043, issued Sep. 3, 2003, both of which are hereby incorporated by reference in their entirety and to which priority is claimed under 35 U.S.C. § 120.

This application is also related to: U.S. patent application Ser. No. 09/399,404, filed Sep. 20, 1999, which is a continuation-in-part of U.S. patent application Ser. No. 09/205,944, filed Dec. 4, 1998, Ser. No. 09/455,865, entitled "Tube-Encased Fiber Grating," Ser. No. 09/455,866, entitled "Strain-Isolated Bragg Grating Temperature Sensor," U.S. Pat. No. 6,229,827, entitled "Compression-Tuned Bragg Grating and Laser," Ser. No. 09/456,113, entitled "Pressure Isolated Bragg Grating Temperature Sensor," U.S. Pat. No. 6,278,811, entitled "Fiber Optic Bragg Grating Pressure Sensor," Ser. No. 09/455,868, entitled "Large Diameter Optical Waveguide, Grating, and Laser," and U.S. Pat. No. 6,298,184, entitled "Method and Apparatus For Forming A Tube-Encased Bragg Grating," filed Dec. 4, 1998. All of the aforementioned applications and/or patents contain subject matter related to that disclosed herein.

TECHNICAL FIELD

This invention relates to tube encased fiber optic pressure sensors, and more particularly to fluid ingression protection mechanisms for a tube-encased fiber grating pressure sensor.

BACKGROUND ART

Sensors for the measurement of various physical parameters such as pressure and temperature often rely on the transmission of strain from an elastic structure (e.g., a diaphragm, bellows, etc.) to a sensing element. In a fiber optic pressure sensor, the sensing element may encased within a glass tube or housing comprised substantially of glass. One example of a fiber optic based sensor is that described in U.S. patent application Ser. No. 09/455,867, entitled "Bragg Grating Pressure Sensor," filed Dec. 6, 1999, which is incorporated herein by reference in its entirety.

The use of fiber optic based devices is widespread in the telecommunications industry, wherein the impervious nature of the glass provides adequate protection given the relatively mild working environments. A relatively recently known use of fiber optic pressure sensors is in an oil well to measure temperature and pressure at various locations along the length of the well bore. The sensors are typically deployed in metal housings in the well bore and are attached on the outside of the casing. Such sensors may often be subjected to extremely harsh environments, such as temperatures up to 200 degrees C. and pressures up to 20 kpsi. These sensors are exceptionally sensitive and are capable of measuring various parameters, such as temperature and pressure, with extreme accuracy. However, the sensitivity and accuracy of fiber optic sensors creates problems when such sensors are used in a harsh environment. Known problems include poor signal to noise ratios, wavelength drift, wavelength shifts, optical losses, hysteresis and mechanical reliability issues. It is the realization of the these problems and the discovery of the causes that will advance the state of the art in fiber optic based well bore monitoring systems.

One such known problem is "creep" of the sensor over time. It has been discovered that the attachment of the sensing element to the elastic structure can be a large source of error if the attachment is not highly stable. In the case of sensors that measure static or very slowly changing parameters, the long-term stability of the attachment to the structure is extremely important. A major source of such long-term sensor instability is creep, i.e., a change in strain on the sensing element even with no change in applied load on the elastic structure, which results in a DC shift or drift error in the sensor signal. Various techniques now exist for attaching the fiber to the structure to minimize creep, such as adhesives, bonds, epoxy, cements and/or solders.

In addition, the sensors are subject to fluids containing hydrocarbons, water, and gases that can have deleterious effects on the accuracy of the sensors. For instance, it has been discovered that the performance of wellbore deployed fiber optic sensors is adversely affected by exposure to hydrogen, which causes irreversible loss along the fiber's length. Further, when the fiber optic sensors include Bragg gratings, exposure to hydrogen causes a shift in the index of the grating that severely lessens the accuracy of the sensor. Increased pressure and temperature of the hydrogen increases the rate at which the fiber optic cables and sensors degrade.

It has also been discovered that certain 'side-hole fiber optic pressure sensors and eccentric core optical fiber sensors experience deleterious effects, such as those described above, when exposed to water at high temperatures and pressures. The adverse effects are presumed to be caused by thin swollen surface layers that lay in close proximity to the sensitive fiber optic core. The observed shifts and changes are presumed to be due to the ingress of water molecules and the subsequent direct expansion of the silica that makes up the fiber itself. In one particular instance, the fibers had a core center-to-surface separation distance of only 10 μm.

However, as discussed hereinbefore, many other problems and errors associated with fiber optic sensors for use in harsh environments still exist. There is a need to discover the sources of these problems and errors and to discover solutions thereto to advance the state of the art in fiber optic sensor use.

SUMMARY OF THE INVENTION

Objects of the present invention include a fiber optic pressure sensor with fluid blocking provisions for use in a harsh environment.

According to the present invention, a fluid blocking fiber optic pressure sensor comprises an optical fiber having at least one pressure reflective element embedded therein, wherein the pressure reflective element has a pressure reflection wavelength; a sensing element having the optical fiber and the reflective element encased therein, the sensing element being fused to at least a portion of the fiber and being strained due to a change in external pressure whereby the strain causes a change in the pressure reflection wavelength indicative of the change in pressure; and a fluid blocking coating disposed on the external surface of the sensing element.

According further to the present invention, the sensing element comprises a tube and the fluid blocking coating comprises at least one layer. The fluid blocking coating comprises a fluid blocking material of gold, chrome, silver, carbon, silicon nitride, or other similar material capable of preventing the diffusion of water molecules into to the sensing element. Alternatively, the coating comprises a first layer comprised of chrome disposed on the outside surface of the sensing element and a second layer comprised of gold disposed on the first layer. In one embodiment, the first layer has a thickness of about 250 Å and the second layer has a thickness of about 20,000 Å.

The present invention also provides a fluid blocking fiber optic pressure sensor having a fiber grating encased in and fused to at least a portion of a sensing element, such as a capillary tube, which is elastically deformable when subject to applied pressure. The invention substantially eliminates drift, and other problems, associated with water or other fluid absorption into the tube. The tube may be made of a glass material for encasing a glass fiber. The invention provides low hysteresis. Furthermore, one or more gratings, fiber lasers, or a plurality of fibers may be encased in the coated tube. The grating(s) or reflective elements are "encased" in the tube by having the tube fused to the fiber at the grating area and/or on opposite sides of the grating area adjacent to or at a predetermined distance from the grating. The grating(s) or laser(s) may be fused within the tube, partially within the tube, or to the outer surface of the tube. The invention may be used as an individual (single point) sensor or as a plurality of distributed multiplexed (multi-point) sensors. Also, the invention may be a feed-through design or a nonfeed-through design. The tube may have alternative geometries, e.g., a dogbone shape, that provides enhanced force to wavelength shift sensitivity and which is easily scalable for the desired sensitivity.

The invention may be used in harsh environments (i.e., environments having high temperatures and/or pressures), such as in oil and/or gas wells, engines, combustion chambers, etc. In one embodiment, the invention may be an all glass sensor capable of operating at high pressures (>15 kpsi) and high temperatures (>150° C.). The invention will also work equally well in other applications regardless of the type of environment.

The foregoing and other objects, features, and advantages of the present invention will become more apparent in light of the following detailed description of exemplary embodiments thereof.

BEST MODE FOR CARRYING OUT THE INVENTION

Figure 1:
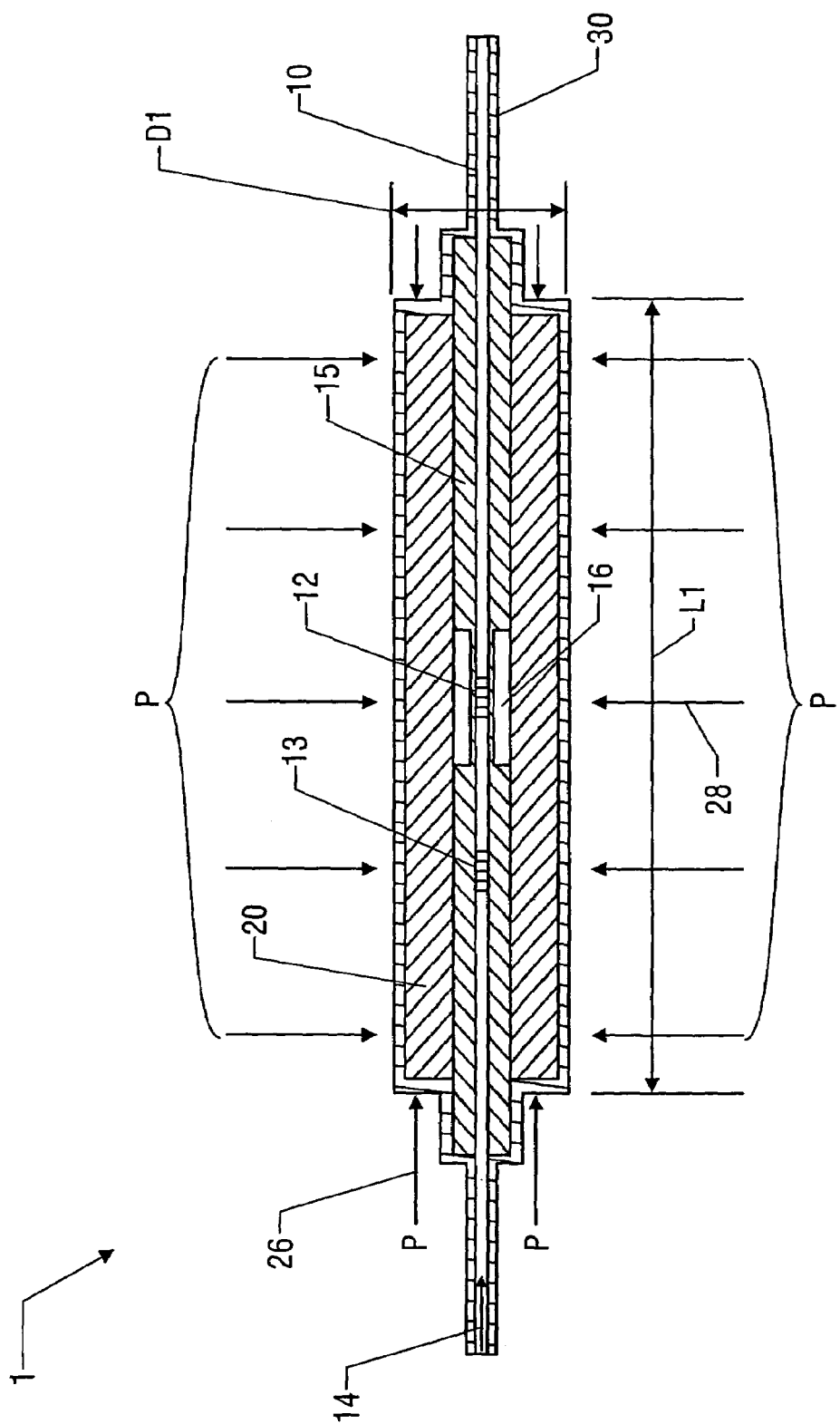
FIG. 1 is a side view of a fluid blocking tube-encased fiber optic sensor in accordance with an embodiment of the present invention.

Referring to FIG. 1, a tube-encased fiber Bragg grating transducer 1 comprises a known optical waveguide 10, e.g., a standard telecommunication single mode optical fiber, having a pressure Bragg grating 12 and a temperature Bragg grating 13 impressed (or embedded or imprinted) in the fiber 10. The fiber 10 is encased within shell 20 such as is described in copending U.S. patent application Ser. No. 09/455,867, entitled "Bragg Grating Pressure Sensor," filed Dec. 6, 1999, and Ser. No. 09/455,865, entitled "Tube-Encased Fiber Grating," also filed Dec. 6, 1999, both of which are hereby incorporated by reference in their entirety.

In one embodiment, the transducer element 1 is constructed by fusing a bare photosensitive fiber 10 in a fused silica capillary tube 15, which functions as a piston as will be described herein below. In the embodiment shown in FIG. 1, Bragg grating 12 is approximately 5 mm in length (although other lengths are possible) and is disposed in the "dogbone" region 16 of capillary tube 15, and Bragg grating 13 is comprised of a different reflective wavelength and is disposed in a thicker piston portion of the capillary tube 15 adjacent to the "dogbone" region 16. Grating 12 is used for interrogation of pressure (hereinafter pressure grating 12), while grating 13 is used to differentially remove temperature effects that are common to all gratings (hereinafter temperature grating 13). A cylindrical, pressure-tight shell 20 is fused to the capillary 15, such that the gratings 12, 13 and dogbone region 16 are sealed inside thereby. For single-ended transducers (not shown), an angle is polished on the end of the glass package opposite the fiber exit point to minimize back reflections and their detrimental effects to Bragg grating interrogation.

The mechanical principles of operation of transducer 1 are based on the elastic response of the shell 20 to an external pressure field represented by P. The sealed shell behaves like a thick walled pressure vessel. In one embodiment, the outside diameter of shell 20 is approximately 6 mm although other lengths are possible and other embodiments include shells that are integral with the sensor as described hereinbelow. The shell 20 isolates the grating portions of the fiber and protects them from the harsh environment in which the transducer is placed. An axial dimensional change of the shell 20, represented by L 1, decreases in response to an end wall pressure 26 and (to a smaller extent) increases in response to a radial pressure 28 due to radial Poisson's effects.

The dog bone region 16 acts like a relatively flexible tie-rod within transducer 1, and senses the end wall axial displacement in response to the pressure P. The reduced diameter (and hence stiffness) of the dogbone region 16 causes the majority of the axial displacement of the shell to be concentrated across this short region, enhancing the strain response of the Bragg grating 12 written within the fiber 10 to pressure. The temperature grating 13 in the piston portion of capillary tube 15 necessarily exhibits an undesired response to pressure, though to a smaller degree, because of the larger cross-sectional area of the piston region in relation to the dogbone region 16. This creates a lower net response to pressure for the temperature grating 13, which is necessary to differentially cancel the significant effects of temperature on Bragg wavelength reflection.

Still referring to FIG. 1, the shell 20 (among other structures) is provided with a layer 30 in accordance with the present invention to provide a barrier to ingression of water, among other fluids, to the shell 20, the capillary tube 15, and gratings 12, 13 as will be described more fully herein after. The fiber 10 has an outer diameter of about 125 microns and comprises silica glass (SiO2) having the appropriate dopants, as is known, to allow light 14 to propagate along the fiber 10. The gratings 12, 13 are similar to those described in U.S. Pat. Nos. 4,725,110 and 4,807,950, entitled "Method for Impressing Gratings Within Fiber Optics," to Glenn et al, and U.S. Pat. No. 5,388,173, entitled "Method and Apparatus for Forming Aperiodic Gratings in Optical Fibers," to Glenn, which are hereby incorporated by reference to the extent necessary to understand the present invention. However, any wavelength-tunable grating or reflective element embedded, etched, imprinted, or otherwise formed in the fiber 10 may be used if desired, or may comprise a Fabry-Perot type device. As used herein, the term "grating" means any of such reflective elements. Further, the reflective element (or grating) 12, 13 may be used in conjunction with the reflection and/or transmission of light. Still further, the present invention encompasses embodiments wherein any number of gratings are disposed within a glass, or substantially all glass, shell 20. In addition, the present invention includes any device wherein optical fibers are used to measure the strain on a glass housing or shell and where the fiber is connected to the shell by an adhesive such as epoxy or other methods of attachment.

Other materials and dimensions for the optical fiber or waveguide 10 may be used if desired. For example, the fiber 10 may be made of any glass, such as silica or phosphate glass, may be made of glass and plastic, or plastic alone, or other materials used for making optical fibers. For high temperature applications, optical fiber made of a glass material is desirable. Also, the fiber 10 may have an outer diameter of 80 microns or other suitable diameters. Further, instead of an optical fiber, any optical waveguide may be used, such as a multi-mode, birefringent, polarization maintaining, polarizing, multi-core, or multi-cladding optical waveguide, or a flat or planar waveguide (where the waveguide is rectangular shaped), or other waveguides. As used herein the term "fiber" includes the above-described waveguides.

The shell 20 and capillary tube 15 are made of a glass material, such as natural or synthetic quartz, fused silica, silica (SiO2), Pyrex® by Corning (boro silicate), Vycor® by Corning (about 95% silica and 5% other constituents such as Boron Oxide), or other glasses. The capillary tube 15 should be made of a material such that it (or the inner surface of the bore hole in the tube 15) can be fused to (i.e., create a molecular bond with, or melt together with) the outer surface (or cladding) of the optical fiber 10 such that the interface surface between the inner diameter of the capillary tube 15 and the outer diameter of the fiber 10 become substantially eliminated (i.e., the inner diameter of the capillary tube 15 cannot be distinguished from and becomes part of the cladding of the fiber 10).

Figure 2:
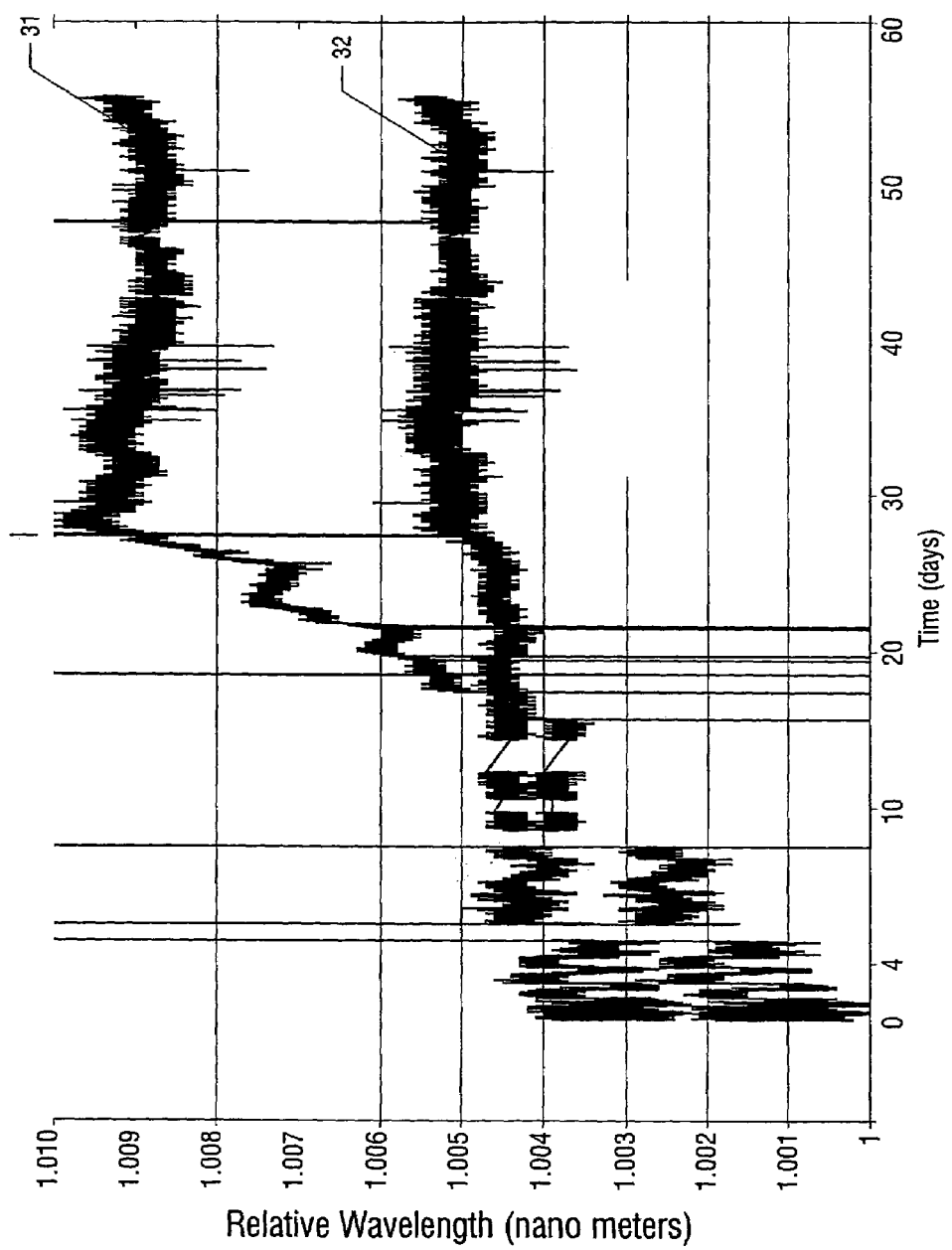
FIG. 2 is a graphical representation of the performance of a prior art tube-encased fiber grating sensor.

It has been discovered by the Applicant that the tube-encased fiber Bragg gratings of the prior art exhibited significant drifts when disposed in harsh environments in the presence of fluids. It was discovered upon further investigation that the relatively impervious nature of glass is severely degraded by elevated temperatures and pressures. Such drifting was discovered during the testing of fiber optic based sensors as described in the above referenced copending applications. In accordance with such testing otherwise stable sensors were immersed in a bath of silicone based oil at constant elevated pressures and temperatures. Silicone oil was used because it was thought to be a stable fluid for transferring pressure to the transducer without contamination. After a relatively short period of about one week at 170° C. degrees and using an atmospheric pressure sensor, both the temperature and pressure gratings exhibited significant and rapid shifts in wavelength as best shown in FIG. 2. FIG. 2 represents a fairly standard plot for stability testing of fiber optic sensors wherein trace 31 represents the relative reflected wavelength of pressure grating 12 and trace 32 represents the relative reflected wavelength of temperature grating 13 over a 55-day testing period. In other words, traces 31, 32 are plotted relative to the actual wavelengths and represent an offset measurement therefrom. The relative offset of the reflected wavelength of pressure grating 12 (trace 31) shows a fairly stable average reflected relative wavelength of about 1.0013 nanometers for the first five days of the test. Between day five and day twenty-eight there was observed a significant shift of about 7.8 pico meters to a relative level of 1.0091 nanometers, at which point it seemed to stabilize for a period of about twenty-seven days (conclusion of the test). Similarly, but to a lesser extent, the relative offset of the reflected wavelength of temperature grating 13 (trace 32) shows a fairly stable average reflected relative wavelength of about 1.0035 nanometers for the first five days of the test and then shows a significant shift of about 1.5 pico meters to a relative level of 1.005 nanometers where it to seemed to stabilize. Therefore, had the transducer been installed in an environment for monitoring the temperature and pressure of an oil well having fluctuating conditions, the drift would have made accurate determination of the actual conditions impossible. For instance, for a 0 to 15,000 psi operational range sensor, having a sensitivity of 0.3846 pm/psi (or 2.6 psi/pm), this drift would translate into a 20.28 psi error.

In accordance with the present invention, it was discovered that trace amounts of water in the silicone oil were accountable for the drifts shown in FIG. 2. As discussed above, prior art fiber optic based sensors exhibited drift due to the expansion of layers of the glass close to the fiber. Where glass tube encased sensors were used, the glass shell was thought to be an adequate barrier, both in its composition and proximity to the gratings, to environmental influences on the accuracy of the sensors. However, through testing it was determined that at elevated temperatures and pressures the glass shell 20 (FIG. 1) absorbed significant amounts of water and caused the shell to expand thereby causing a wavelength shift in the gratings 12, 13 at constant pressure and temperature conditions. The expansion of the shell 20 as a result of water ingress has a greater influence on pressure grating 12 in the dogbone region 16 because of the concentration of the axial displacement across the reduced cross section as described herein above and as shown by trace 31 in FIG. 2 when compared to trace 32.

However, applying a barrier layer 30 as shown in FIG. 1 eliminates the cause of the error associated with drift. Barrier layer 30, when applied to the outside surfaces of transducer 1, eliminates the ingress of water, or other similar fluids, into shell 20 ana thereby precludes expansion of the shell and the drift caused thereby. Although shown as coating optical fiber 10, capillary tube 15, and shell 20, embodiments of the present invention encompass the coating of only shell 20 with layer 30 to the extent necessary to preclude fluid ingress into the shell.

Layer 30 may comprise any material, or combination of materials, capable of preventing the diffusion of water molecules into shell 20. However, depending on the particular environment in which transducer 1 will be used, it may be critical to the operation of the transducer that layer 30 not cause significant mechanical effects (including hysteresis) that could adversely affect the ability of the shell to react to pressure changes. For instance, if the characteristics of layer 30 were such that the stiffness of shell 20 was significantly increased, the sensitivity and/or repeatability of the transducer may be unacceptably diminished. Other mechanical effects of the coating layer 30 which could have deleterious effects on the operation of the transducer include coating creep, coating integrity, strain capability, etc. Both the material choice and thickness of layer 30 may contribute to these mechanical effects. Several materials have been considered based on their ability to block water molecules, to adhere to the glass shell 20, and to limit the amount of adverse mechanical effects. Among the materials considered satisfactory are chrome, gold, silver, carbon, and silicon nitride. However, other similar materials and combinations of materials are contemplated by the present invention.

One embodiment of transducer 1 (FIG. 1) includes a coating 30 comprised of a combination of a first layer of chrome and a second layer of gold. The coatings may be applied to shell 20 using a standard sputtering process as will be more fully described herein below, but the present invention should be understood to encompass any known method of coating the shell. In this particular embodiment, the chrome layer was applied in a uniform manner to achieve a thickness of about 250 Å, and then a second layer was applied in a uniform manner to achieve a gold layer of about 20,000 Å. Other satisfactory embodiments that have been tested have gold layers as thin as 500 Å.

Figure 3:
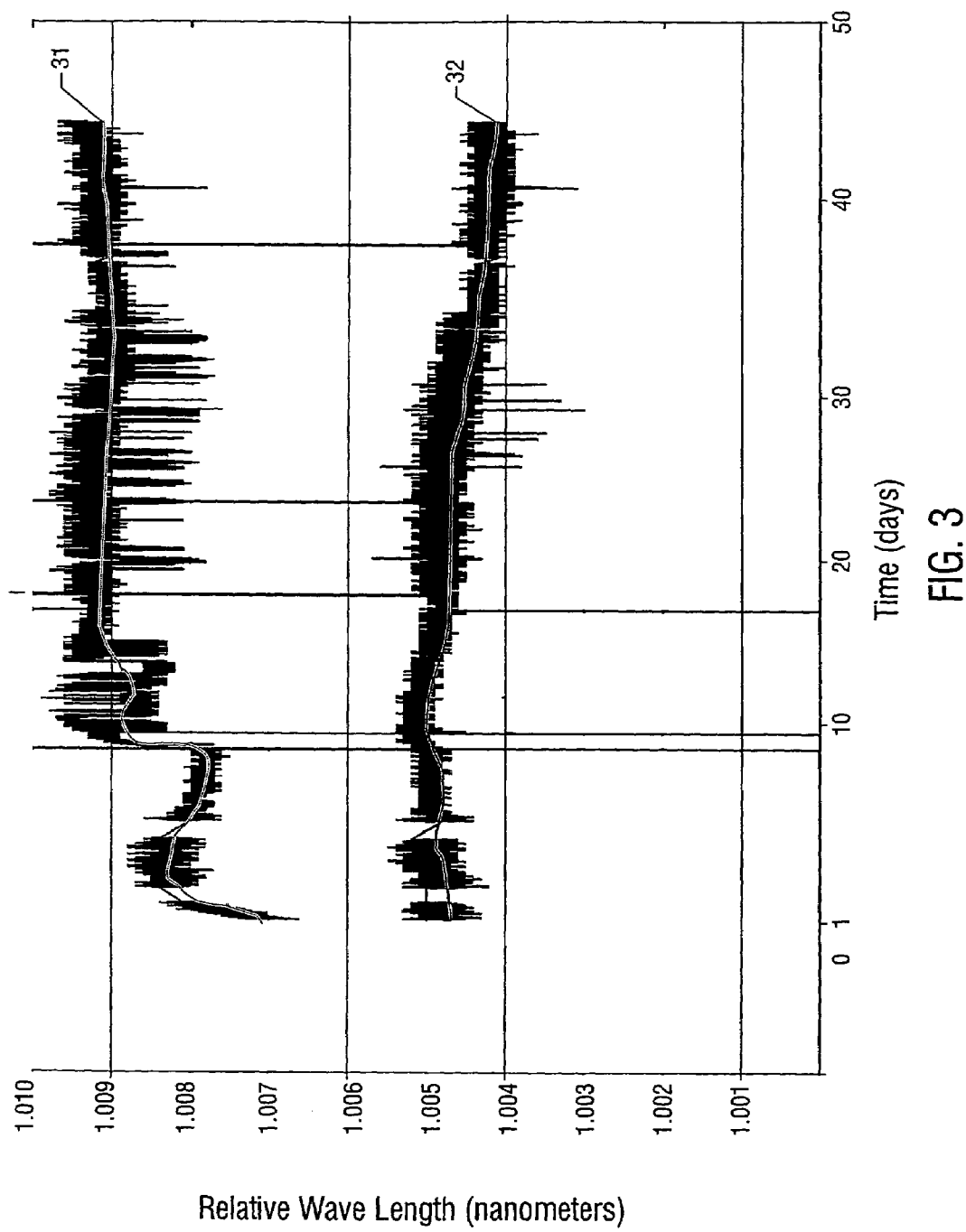
FIG. 3 is a graphical representation of the performance of a tube-encased fiber grating sensor in accordance with an embodiment of the present invention.

Coating layer 30 according to this embodiment is effective at reducing the drift exhibited by the prior art as best shown with reference to FIG. 3. As in FIG. 2, trace 31 represents the relative reflected wavelength of pressure grating 12 and trace 32 represents the relative reflected wavelength of temperature grating 13 over about a 46-day testing period in conditions substantially identical to those described with respect to FIG. 2. The relative offset of the reflected wavelength of pressure grating 12 (trace 31) shows a fairly stable average reflected relative wavelength of about 1.008 nanometers for the first ten days of the test. Thereafter, between day ten and day twelve, a small, but noticeable, shift of approximately 1.0 picometer is observed to a relative level of 1.009 nanometers where the sensor remained stable to the conclusion of the test. Coating 30 of this embodiment thus represents an improvement which is six times as effective at blocking water, and its deleterious effects, when compared to the prior art. In addition, the reflected wavelength of temperature grating 13 (trace 32) shows an almost imperceptible change over the same time period. In addition, testing was performed on this embodiment to quantify the mechanical effects of coating 30 on the sensor and to validate that there were acceptable levels of creep or hysteresis caused by the coating.

Figure 4:
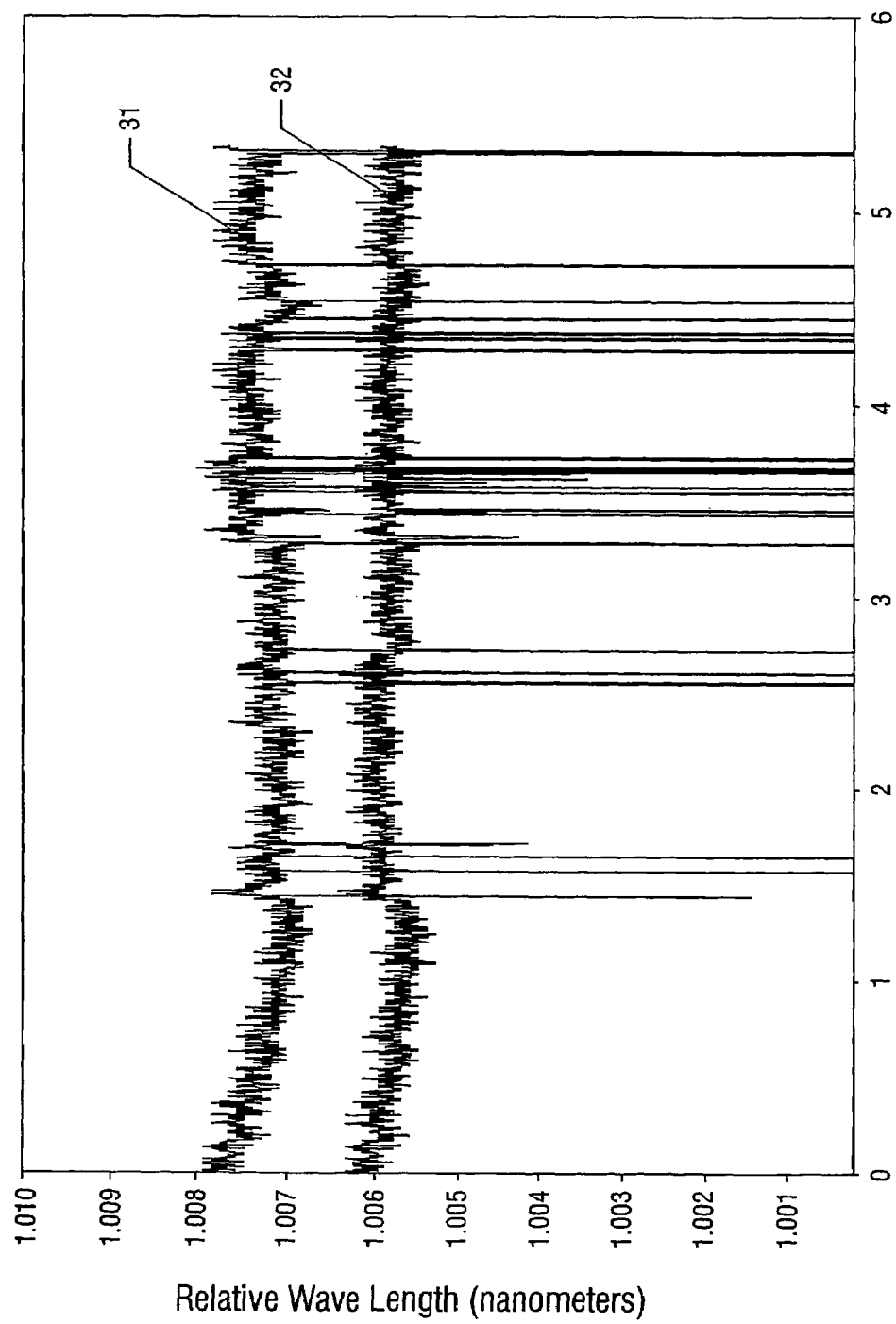
FIG. 4 is a graphical representation of the performance of an alternative embodiment of a tube-encased fiber grating sensor in accordance with the present invention.

In an alternative embodiment, coating layer 30 of transducer 1 is comprised of a layer of carbon applied to glass shell 20, which again can be achieved using a standard sputtering process. In this embodiment, the carbon of coating layer 30 was applied in a uniform manner to achieve a thickness of about 500 Å. Coating layer 30 of this particular embodiment was also shown to be effective at reducing the drift exhibited by the prior art, as best shown with reference to FIG. 4. As before, trace 31 represents the relative offset of the reflected wavelength of pressure grating 12 and trace 32 represents the relative offset of the reflected wavelength of temperature grating 13 as measured over about a five-day testing period in conditions substantially identical to those described herein above referring to FIG. 2. (The test results in FIG. 4 were terminated earlier than in FIG. 2 because of the close correlation of the results. However, subsequent long term testing has validated the robustness of the coating.) The reflected wavelength of pressure grating 12 (trace 31) shows a fairly stable average reflected relative wavelength of about 1.0072 nanometers for the entire duration of the test with no perceptible shift due to water ingression. Similarly, the reflected wavelength of temperature grating 13 (trace 32) shows an almost imperceptible change over the same time period. The carbon coating 30 of this embodiment thus represents an improvement which is at least twenty times as effective at blocking water, and its deleterious effects, when compared to the prior art.

In an alternative embodiment of the present invention, the shell 20 and a portion of or all of the tube-encased fiber grating 1 may be replaced by a large diameter silica waveguide grating, such as that described in copending U.S. patent application Ser. No. 09/455,868, entitled "Large Diameter Optical Waveguide, Grating and Laser," which is incorporated herein by reference. The waveguide includes coating 30 as described hereinabove to provide fluid blocking capability in accordance with the present invention.

As stated before, any method of coating at least shell 20 of transducer 1 with a fluid blocking coating 30 is contemplated by the present invention. Coating 30 may be applied to shell 20 after the shell has been disposed about the fiber 10, and capillary tube 15 (if applicable), but may be applied earlier in the process without departing from the scope of the present invention. One known method of providing coating 30 comprises the sputtering of the coating onto the glass shell 20. Prior to the sputtering process, shell 20 is prepared to ensure that coating 30 makes intimate contact with the surface of the shell. In one embodiment, shell 20 is prepared for coating by wiping the outside surface of the shell, as well as other outside surfaces to be coated, such as capillary tube 15 and fiber 10 if applicable, with a de greasing solution, such as acetone. The surface may then be etched to enhance the adhesion of the coating to the shell. In one embodiment, shell 20 is subjected first to an oxygen-ion etch followed by an argon-ion etch. Subsequent to such etching, coating 30 is deposited onto the outside surface by sputtering or other similar coating processes that ensure uniform coverage of the shell (and other components).

It should be understood that the dimensions, geometries, and materials described for any of the embodiments herein are merely for illustrative purposes and as such any other dimensions, geometries, or materials may be used if desired, depending on the application, size, performance, manufacturing or design requirements, or other factors, in view of the teachings herein.

For instance, the present invention further comprises a fluid blocking fiber optic pressure sensor, wherein the optical sensing element and the shell are comprised of the same material and essentially constitute a relatively large diameter fiber section. In this particular embodiment, at least a portion of the sensing element has a transverse cross-section which is contiguous, is made of substantially the same material, which has an outer transverse dimension of at least 0.3 mm, and which has a fluid bloc~ing coating disposed on the external surface of the sensing element.

Further, it should be understood that, unless otherwise stated herein, any of the features, characteristics, alternatives or modifications described regarding a particular embodiment herein may also be applied, used, or incorporated with any other embodiment described herein. Also, the drawings shown herein are not drawn to scale.

Although the invention has been described and illustrated with respect to exemplary embodiments thereof, the foregoing and various other additions and omissions may be made thereto without departing from the spirit and scope of the present invention.

What is claimed is:

1. An optical pressure sensor, comprising:
    an optical waveguide having a core and a cladding, wherein a grating is formed in the core at a first axial location along the optical waveguide between two second axial locations, wherein the diameter of the cladding at the second axial locations is greater than at the first axial location;

a shell affixed to the optical waveguide at the second axial locations to form an annular cavity surrounding the optical waveguide at the first axial location; and a coating formed on at least an external surface of the shell to prevent moisture ingress from affecting the optical pressure sensor.

2. The pressure sensor of claim 1, wherein the coating is non-polymeric.

3. The pressure sensor of claim 1, wherein the coating is formed on a portion of an external surface of the optical waveguide.

4. The pressure sensor of claim 1, wherein the coating is selected from at least one member of the group consisting of gold, chrome, silver, carbon and silicon nitride.

5. The pressure sensor of claim 1, wherein the coating comprises at least two layers of different materials.

6. The pressure sensor of claim 1, wherein the coating is capable of preventing the diffusion of water molecules into the shell.

7. The pressure sensor of claim 1, wherein the coating comprises:

a first layer comprising chrome formed on the external surface of the shell;

and a second layer comprising gold formed on the first layer.

8. The pressure sensor of claim 7, wherein the first layer has a thickness of about 250 A and wherein the second layer has a thickness of about 20,000 A.

9. The pressure sensor of claim 1, wherein the grating is a Fiber Bragg Grating.

10. The pressure sensor of claim 1, wherein the optical waveguide further comprises an optical temperature sensor.

11. The pressure sensor of claim 10, wherein the optical temperature sensor and the grating are connected along the optical waveguide in series.

12. An optical pressure sensor, comprising:

an optical waveguide comprising a pressure-sensitive reflective element;

a shell fused to a cladding of the optical waveguide at first and second axial locations to form a cavity around the pressure-sensitive reflective element; and a coating formed on at least an external surface of the shell to prevent moisture ingress from affecting the optical pressure sensor.

13. The pressure sensor of claim 12, wherein the coating is non-polymeric.

14. The pressure sensor of claim 12, wherein the coating is formed on a portion of an external surface of the optical waveguide.

15. The pressure sensor of claim 12, wherein the coating is selected from at least one member of the group consisting of gold, chrome, silver, carbon and silicon nitride.

16. The pressure sensor of claim 12, wherein the coating comprises at least two layers of different materials.

17. The pressure sensor of claim 12, wherein the coating is capable of preventing the diffusion of water molecules into the shell.

18. The pressure sensor of claim 12, wherein the pressure-sensitive reflective element is a Fiber Bragg Grating.

19. The pressure sensor of claim 12, wherein the optical waveguide further comprises an optical temperature sensor.

20. The pressure sensor of claim 19, wherein the optical temperature sensor and the pressure-sensitive reflective element are connected along the optical waveguide in series.

* * * * *